United States Patent
Nunn et al.

(10) Patent No.: US 11,908,645 B2
(45) Date of Patent: Feb. 20, 2024

(54) ENABLING EQUIPMENT TO WITHSTAND AND CONTROL THE EFFECTS OF INTERNAL ARCING FAULTS

(71) Applicant: Powell Electrical Systems, Inc., Houston, TX (US)

(72) Inventors: Matthew C. Nunn, Houston, TX (US); Michael W. Wactor, Houston, TX (US)

(73) Assignee: Powell Electrical Systems, Inc., Houston, TX (US)

( * ) Notice: Subject to any disclaimer, the term of this patent is extended or adjusted under 35 U.S.C. 154(b) by 93 days.

(21) Appl. No.: 17/879,991

(22) Filed: Aug. 3, 2022

(65) Prior Publication Data

US 2023/0197377 A1    Jun. 22, 2023

Related U.S. Application Data

(60) Provisional application No. 63/292,517, filed on Dec. 22, 2021.

(51) Int. Cl.
*H01H 33/12* (2006.01)
*H01H 33/26* (2006.01)
(Continued)

(52) U.S. Cl.
CPC ............ *H01H 33/12* (2013.01); *H01H 33/26* (2013.01); *H02H 1/0015* (2013.01); *H02H 7/222* (2013.01)

(58) Field of Classification Search
CPC ........ H01H 33/12; H01H 33/20; H01H 33/26; H01H 33/245; H02H 1/0015; H02H 7/222; H02H 7/26; H02H 9/02; H02B 13/025

(Continued)

(56) References Cited

U.S. PATENT DOCUMENTS 4,242,718 A    12/1980 Shariff et al.
5,073,764 A    12/1991 Takahashi et al.
(Continued)

FOREIGN PATENT DOCUMENTS

CN    102957102 A    3/2013
EP    3432431 A1     1/2019
GB    2569233 A      6/2019

OTHER PUBLICATIONS

Bouvier et al., "Fault Arcs on Busbar Sets and Switchboards," Cahiers Techniques Merlin Gerin, No. 38, May 1983, pp. 1-8.

*Primary Examiner* — William A Bolton
(74) *Attorney, Agent, or Firm* — Robert A. Voigt, Jr.; Shackelford, Bowen, McKinley & Norton, LLP

(57) ABSTRACT

Systems and methods for improving control of an internal arc fault in equipment. The equipment includes a bus configured to provide three-phase power from an incoming line. Furthermore, the equipment includes a current loop formed from a first conductor and a second conductor, where current is received from the bus. The current loop uses electromagnetic forces of a short-circuit current caused by an internal arcing fault of the equipment to move the first and second conductors relative to each other. In response to the movement of the first and second conductors, the current loop creates a gap between the first and second conductors where a new arc ignites at the gap. In this manner, the loop design takes advantage of the natural electromagnetic force to reduce the arc energy at the point of initiation and relocates the energy release point to an exhaust vent of the equipment.

20 Claims, 8 Drawing Sheets

(51) Int. Cl.
*H02H 1/00* (2006.01)
*H02H 7/22* (2006.01)

(58) Field of Classification Search
USPC .............. 218/1, 2, 12, 75, 74, 79, 80, 100; 200/50.2
See application file for complete search history.

(56) References Cited

U.S. PATENT DOCUMENTS

| | | |
|---|---|---|
| 8,159,319 B2 | 4/2012 | Ferree |
| 8,179,145 B2 * | 5/2012 | Kinsel .................. H02H 1/0015 324/509 |
| 8,891,211 B2 * | 11/2014 | Dent ....................... H02S 50/10 361/42 |
| 8,922,977 B2 | 12/2014 | Faber |
| 8,952,252 B2 | 2/2015 | Bugaris et al. |
| 9,338,866 B1 | 5/2016 | Faber et al. |
| 9,412,549 B2 | 8/2016 | Rakuff et al. |
| 9,450,387 B2 * | 9/2016 | Faber ....................... H02B 1/20 |
| 10,098,270 B2 | 10/2018 | Bugaris et al. |
| 10,673,224 B2 * | 6/2020 | Macerini ................ G01R 31/12 |
| 10,916,391 B1 * | 2/2021 | Payne .................. G02B 6/4298 |
| 2013/0038971 A1 * | 2/2013 | Ward ................... H02H 1/0015 361/86 |
| 2013/0342294 A1 * | 12/2013 | Aarskog ................ H01H 53/02 335/196 |
| 2017/0093147 A1 * | 3/2017 | Freer ..................... H02H 3/335 |
| 2020/0021098 A1 * | 1/2020 | Politis ................... H02H 9/041 |
| 2020/0209295 A1 * | 7/2020 | Marshall .............. G01R 31/085 |

* cited by examiner

ENABLING EQUIPMENT TO WITHSTAND AND CONTROL THE EFFECTS OF INTERNAL ARCING FAULTS

TECHNICAL FIELD

The present invention relates generally to electrical power equipment, and more particularly to reducing the fault energy in areas where the power circuit of the electrical power equipment (e.g., arc-resistant switchgears, motor control centers or other equipment, such as medium-voltage motor control centers rated as arc-resistant in accordance with the Institute of Electrical and Electronics Engineers (IEEE) guide for testing switchgears rated up to 52 kV for internal arcing faults, such as IEEE C37.20.7-207) is accessible through exterior doors and covers.

BACKGROUND

An arc fault is a high power discharge of electricity between two or more conductors. Such arc faults may occur internally within electrical power equipment (also referred to herein as simply "electrical equipment"). These "internal arcing faults" may be said to be abnormal events that are not addressed by the normal operation of the electrical equipment.

Normal operation involves providing the ability to interrupt and clear short-circuit events that occur down-stream from the equipment on the circuit load. When an internal arcing fault occurs in electrical equipment, the electrical equipment requires other devices that are located upstream from it to interrupt the short-circuit current. The upstream device sees the fault as a load side short-circuit and will perform its normal functions to interrupt that short-circuit. To protect personnel around the equipment experiencing the fault, a design referred to as "arc-resistant switchgear" was created. This design is intended to withstand and control the effects of the internal arcing fault to provide time for the upstream protection to operate and clear the fault. Specifically, the arc-resistant switchgear is designed to redirect arc energy up and out of the equipment, such as via ducts/vents, away from equipment operators.

Internal arcing events exert large mechanical forces on the mechanical structure of the equipment where they occur. This is due, in part, to their extreme heat (20,000 Kelvin) superheating the surrounding air and also due to the vaporization of any material the arc energy touches. Such vaporization may result in an expansion of the material, such as transitioning the material from solid to gas. For example, vaporizing a copper bus results in an expansion at a rate of approximately 64,000:1. As a result of such expansion, rapid overpressure and explosion of the equipment is a common occurrence during an arcing fault.

At such high pressure, it is also common for the plasma produced by the arc energy to escape through openings created by the structural failure of the equipment, the openings of covers and doors, or through gaps between components of the assembly. Furthermore, the arc energy may also root on the walls of the equipment and erode that material thereby creating holes for the plasma to escape.

Electrical arcs are totally random in both the location where they begin and in the energy they can produce. The arc energy is based on the short-circuit current level and the arc voltage. The arc voltage is controlled by the length of the arc, which can vary dramatically during an event. Arc-resistant equipment needs to be able to withstand and control these hazardous effects until the upstream protection can operate.

SUMMARY

In one embodiment of the present disclosure, an equipment with arc-resistant capability comprises a bus configured to provide three-phase power from an incoming line. The equipment further comprises a current loop formed from a first conductor and a second conductor, where a current is received from the bus. Furthermore, the current loop uses electromagnetic forces of a short-circuit current caused by an internal arcing fault of the equipment to move the first and second conductors relative to each other, where the current loop creates a gap between the first and second conductors in response to the movement of the first and second conductors and where a new arc ignites at the gap.

In another embodiment of the present disclosure, a method for improving control of an internal arc fault occurring within an equipment comprises forming a current loop from a first conductor and a second conductor, where the current loop uses electromagnetic forces of a short-circuit current caused by an internal arcing fault of the equipment to move the first and second conductors relative to each other. The method further comprises creating a gap between the first and second conductors by the current loop in response to the movement of the first and second conductors, where a new arc ignites at the gap.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
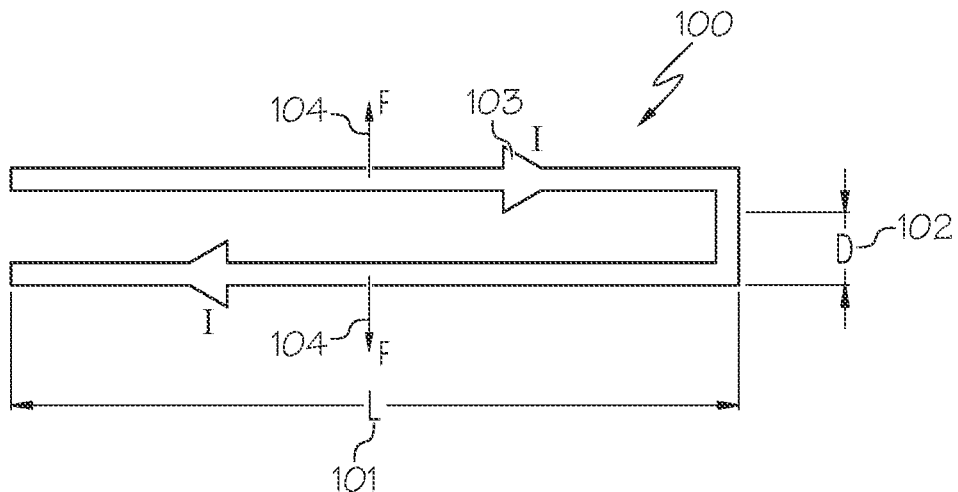
FIG. 1 illustrates a current loop in accordance with an embodiment of the present disclosure.

As stated in the Background section, electrical arcs are totally random in both the location where they begin and in the energy they can produce. The arc energy is based on the short-circuit current level and the arc voltage. The arc voltage is controlled by the length of the arc, which can vary dramatically during an event. Arc-resistant equipment needs to be able to withstand and control the hazardous overpressure and high-temperature gases created by the arc energy until the upstream protection can operate.

The embodiments of the present disclosure provide a means for enabling arc-resistant equipment to withstand and control the effects of electrical arcs until the upstream protection can operate.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one," and the use of "or" means "and/or," unless specifically stated otherwise. Furthermore, the use of the term "including," as well as other forms, such as "includes" and "included," is not limiting. Also, terms such as "element" or "component" encompass both elements or components comprising one unit and elements or components that comprise more than one unit unless specifically stated otherwise.

In one embodiment, the arc fault effects are controlled by controlling where the electrical arc moves within the equipment (e.g., arc-resistant switchgear, motor control center). The high current present during a short-circuit creates an electromagnetic force that acts on the conductors (e.g., bus bars or cables) causing them to move in a specific direction defined by the left-hand rule. When current flows through a conducting wire, and an external magnetic field is applied across that flow, the conducting wire experiences a force perpendicular both to that field and to the direction of the current flow (i.e., they are mutually perpendicular). According to the left-hand rule, current (I) in the direction of the middle finger and magnetic flux (Φ) corresponding to the index finger indicates force (F) in the direction of the thumb.

Electromagnetic force is calculated by:

$$F = B \times I \times \text{Conductor Length} \quad \text{(Equation 1)}$$

where F=Force, B=Magnetic Flux Density and I=Current. For single phase current moving in opposite directions, the electromagnetic force is calculated as follows:

$$F = 0.12 \frac{I^2 L}{D} \quad \text{(Equation 2)}$$

where $L$ = length and $D$ = distance

FIG. 1 illustrates a current loop 100 with a length (L) 101 and a distance (D) 102 in accordance with an embodiment of the present disclosure. Current (I) 103 moves in the direction shown or clockwise from the top of the loop to the bottom, thereby causing force (F) 104 to be exerted on the top and bottom portions of the current loop in opposite directions. As can be seen from Equation 2, the force increases with increasing current (I) and length (L), but decreases with increasing distance (D).

The same electromagnetic forces that can move the bus during a short-circuit event can be utilized to separate conductors in the power circuit and introduce an arc that will: (1) create a series resistive element that will reduce the arc energy at the initial fault point, and (2) transfer significant levels of arc energy to a point where that energy can be more easily controlled and directed away from where personnel may be working.

In one embodiment, the principles of the present disclosure do not attempt to interrupt current flow or commutate the arcing fault into a bolted fault with the design. Instead, the principles of the present disclosure take advantage of a phenomenon that naturally occurs during a short-circuit and use it to reduce the arc energy at the point of initiation and relocate the energy release point to an area closer to an exhaust vent for the equipment design.

The equipment enclosure may be designed to withstand, control, and direct the arc by-products. The current loop design, should it fail to open, does not impede this activity. The loop provides a consistent focal point for the arc, regardless of where the initial fault occurs within the equipment, with little or no additional cost.

Systems and methods discussed herein provide arc-resistance designs to move an arc and release arc energy to a desired location of the equipment, thereby allowing the equipment to withstand and control the effects of internal arcing faults. The equipment may be a switchgear, a motor control center (MCC), a medium-voltage MCC, a low-voltage MCC, or the like. The design introduces a loop of bus bar that will, under conditions of an internal arcing short-circuit of a certain magnitude, use the electromagnetic forces of that short-circuit current to push the bus bars in the loop away from each other, creating a gap between the conductors where a new arc will ignite. The arc, being a resistive element, will reduce the fault current level at the original arc initiation point and cause the arc energy to root itself at the point where the current loop opens at a desired location of the equipment. In doing so, the energy release becomes consistent and more manageable. This technique also serves to move the hazardous energy of the arcing fault away from undesirable areas and relocates that energy closer to a pressure relief venting location. Moving the arc energy away from undesirable areas, such as the access doors and covers, reduces the mechanical stresses on the equipment and helps to minimize the duration of fault gas exposure seen by the equipment, such as the door frame seams. In one embodiment, the current loop is designed to remain connected during down-stream short-circuit events thereby allowing the current-limiting fuse to clear the fault during normal operation of the equipment.

In one embodiment, a "current loop" is created by forming the bus such that the conductor extends from the main bus for a distance and then returns via a second conductor to connect with the vertical riser bus in close proximity to the main bus. Since there is very little impedance in the conductor, the voltage drop across the loop is very small and there is no risk of the system voltage breaking down across the loop. As a result, the gap between the conductors can be very small, where such a distance between the conductors may be used to determine the electromagnetic forces exerted by the current flow as discussed above.

Systems and methods for providing arc-resistance designs are discussed further herein in relation to an MCC, particularly a medium-voltage motor control center (MVMCC), solely for the purposes of illustration. It shall be understood by one of ordinary skill in the art that various aspects of the design are applicable to other equipment as well.

MCCs or MVMCCs are assemblies to control some or all electric motors in a central location. A MCC may include multiple enclosed sections having a common power bus where each section contains a combination starter, which in turn includes a motor starter, fuses or circuit breaker, and a power disconnect. A MCC may also include push buttons, indicator lights, variable-frequency drives, programmable logic controllers, and metering equipment. MCCs are typically found in large commercial or industrial buildings where there are many electric motors that need to be controlled from a central location, such as a mechanical room or electrical room.

A method for improving the control of an internal arc fault occurring within an electrical equipment is discussed below in connection with FIG. 2.

Figure 2:
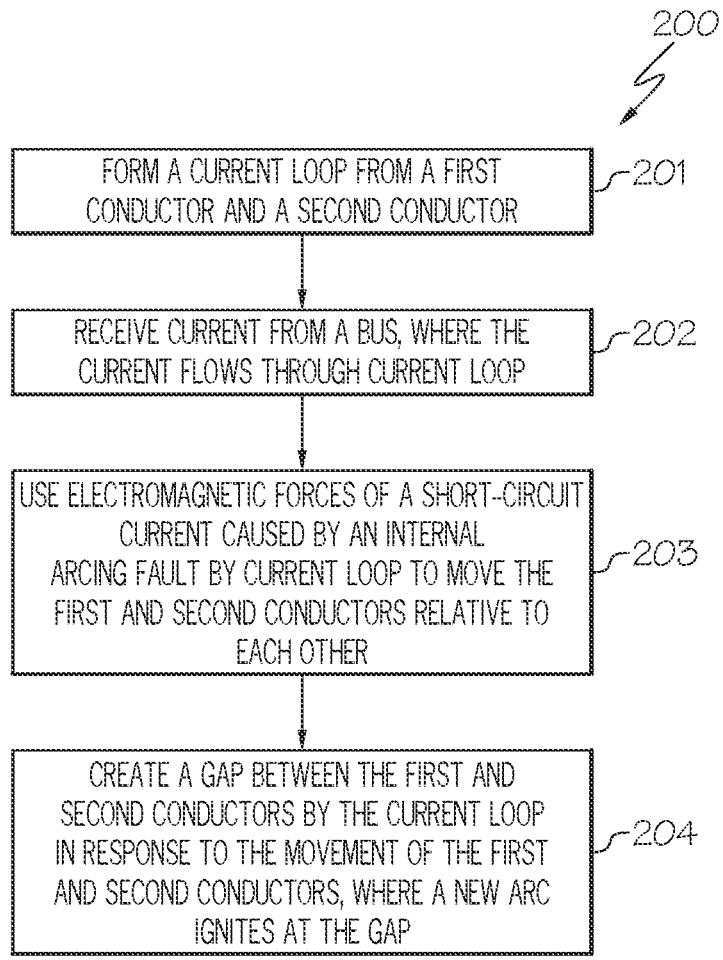
FIG. 2 is a flowchart of a method for improving the control of an internal arc fault occurring within an electrical equipment in accordance with an embodiment of the present disclosure.

FIG. 2 is a flowchart of a method 200 for improving the control of an internal arc fault occurring within an electrical equipment in accordance with an embodiment of the present disclosure.

Referring to FIG. 2, in conjunction with FIG. 1, in step 201, a current loop, such as current loop 100, is formed from a first conductor and a second conductor.

In step 202, current, such as from a bus (e.g., a bus configured to provide three-phase power from an incoming line), is received, where the current flows through current loop 100 from a starting end of the first conductor towards an opposite end of the first conductor or a connection point electrically connected to the second conductor. Furthermore, the current flows from the connection point or a starting end of the second conductor towards an opposite end of the second conductor.

In step 203, current loop 100 uses the electromagnetic forces of a short-circuit caused by an internal arcing fault to move the first and second conductors relative to each other.

In step 204, a gap between the first and second conductors is created by the current loop, such as current loop 100, in response to the movement of the first and second conductors, where a new arc ignites at the gap.

Additional details regarding method 200 is provided below in connection with FIGS. 3A-3B, 4-6 and 7A-7D.

Figure 3A:
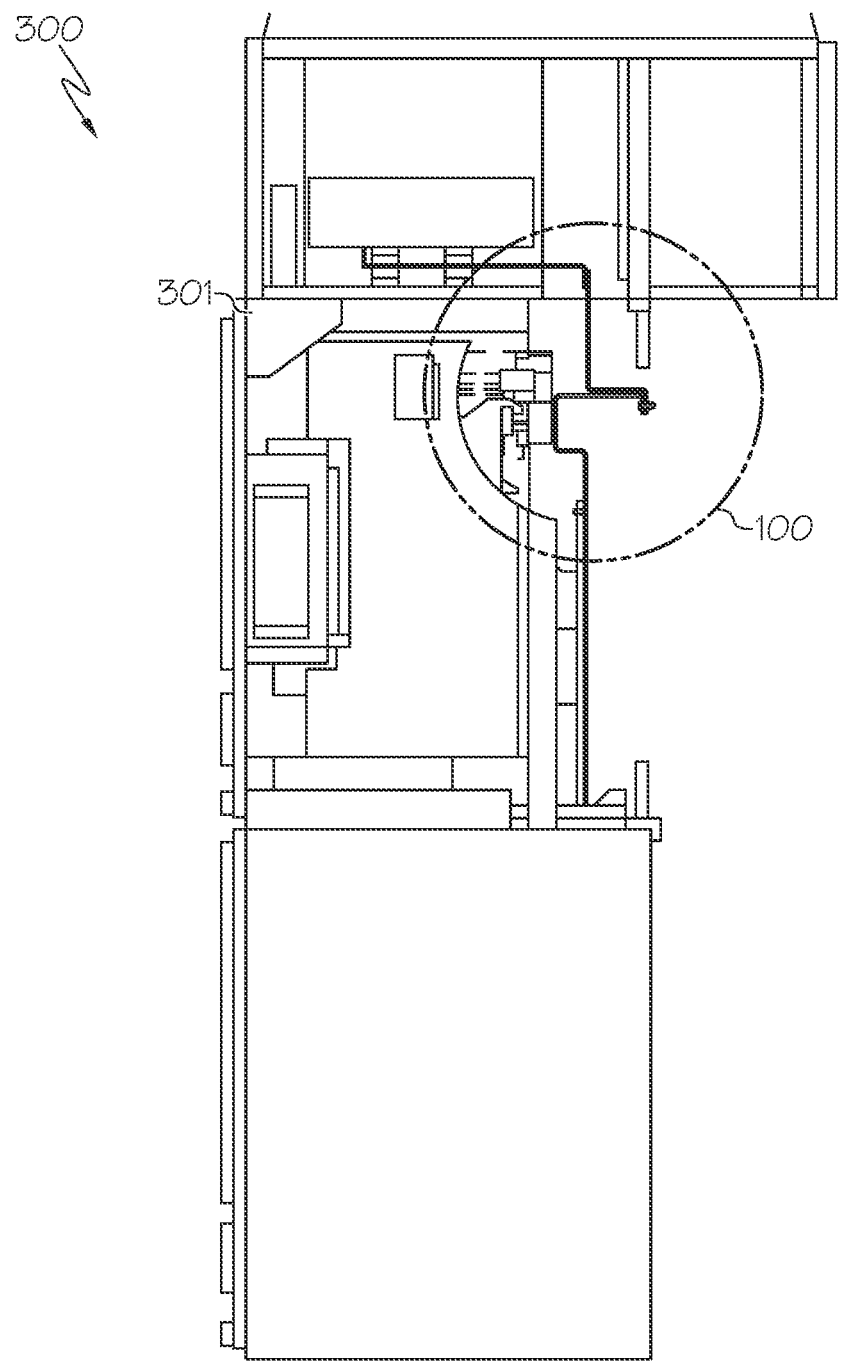
FIGS. 3A-3B illustrate a motor control center in accordance with an embodiment of the present disclosure.
Figure 3B:
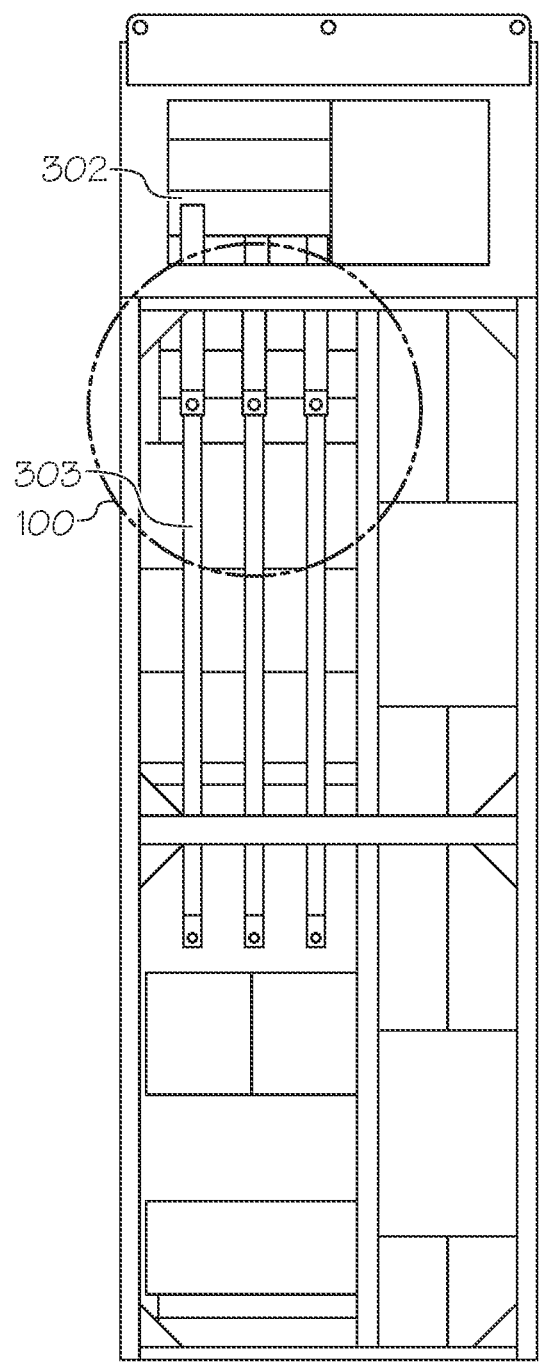

Referring now to FIGS. 3A-3B, FIGS. 3A-3B illustrate a nonlimiting example of a sectioned side view and a rear view of a motor control center 300 (e.g., Powell® MVMCC), respectively, in accordance with an embodiment of the present disclosure.

For the sake of brevity, discussion is limited to relevant portions of the MCCs to the systems and methods discussed herein and various commonly known components of the MCCs may be present as well. As shown in FIG. 3A, an enclosure 301 is used to house various components of the MCC 300. In one embodiment, as shown in FIG. 3B, MCC 300 includes a main bus 302 (e.g., a bus configured to provide three-phase power from an incoming line) and a vertical riser bus 303 (e.g., a bus configured to distribute power). The circled area in each view shows the location of current loop 100 (FIG. 1).

Figure 4:
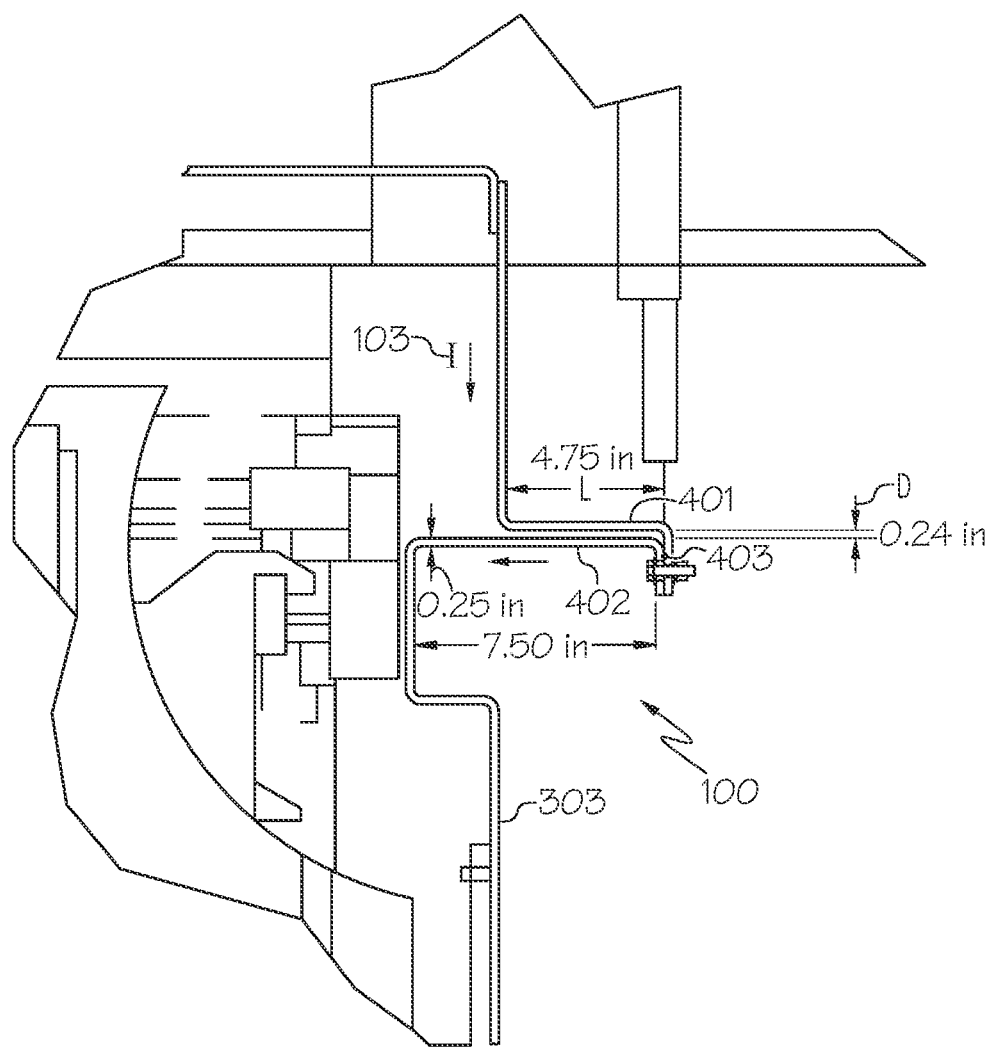
FIG. 4 illustrates an enlarged view of a current loop for the motor control center in accordance with an embodiment of the present disclosure.

FIG. 4 illustrates an enlarged view of current loop portion 100 (FIG. 1) of motor control center 300 (FIG. 3) in accordance with an embodiment of the present disclosure. The details shown in FIG. 4 are nonlimiting dimensions and details applicable to examples discussed herein.

In one embodiment, a first conductor or top portion 401 of the current loop that extends unsupported from a portion of a bus, such as the main bus, for a desired distance and a second conductor or bottom portion 402 of the current loop that connects with another portion of the bus, such as the vertical riser bus 303, in close proximity to the bus, create a "current loop" 100.

In other words, one end of first conductor 401 is electrically connected to the main bus 302 or the like, and the opposite end is electrically connected to the first end of second conductor 402. In one embodiment, the opposite end of second conductor 402 is electrically connected to the vertical riser bus 303 or the like. In one embodiment, a portion of first conductor 401 and second conductor 402 form current loop 100 with a length (L) of the loop and distance (D) between the two conductors or the top and bottom portions of the current loop. The width and thickness of the conductors 401, 402 may be any suitable value, but the nonlimiting example shown generally conforms to dimensions of similar components of the bus. In one embodiment, first conductor 401 and second conductor 402 are secured together for electrical connection via any suitable fasteners, such as a nut and bolt of a desired size. Similar to the prior illustration of FIG. 1, the current (I) 103 flows through loop 100 in the direction shown by the arrows. In particular, current (I) 103 flows through loop 100 from the start of first conductor 401 via a bus connection towards connection point 403 with second conductor 402, and from connection point 403 towards the opposite end of second conductor 402 back to another suitable bus connection. In the nonlimiting example shown, the connection of first conductor 401 to main bus 302 and the connection of second conductor 402 to vertical riser bus 303 are chosen to facilitate a desired current flow direction. In other embodiments, current loop 100 may be connected to the components of a bus in any suitable manner desired that forms a current loop. In some embodiments, at least one current loop is provided for each phase. In the example shown, three current loops may be provided for the three phases of the MVMCC equipment (see FIG. 3B). In some embodiments, the equipment down-stream of loop 100 may be protected by a current-limiting fuse.

In the nonlimiting example shown, the length (L) of loop 100 is 4.75 inches and the distance (D) is 0.24 inches. The thickness of both conductors 401, 402 is 0.25 inches and the length of a horizontal portion of second conductor 402 is 7.50 inches. It shall be apparent to one of ordinary skill in the art the dimensions are applicable to the example shown, but may be modified without undue experimentation for other embodiments with different ratings.

Figure 5:
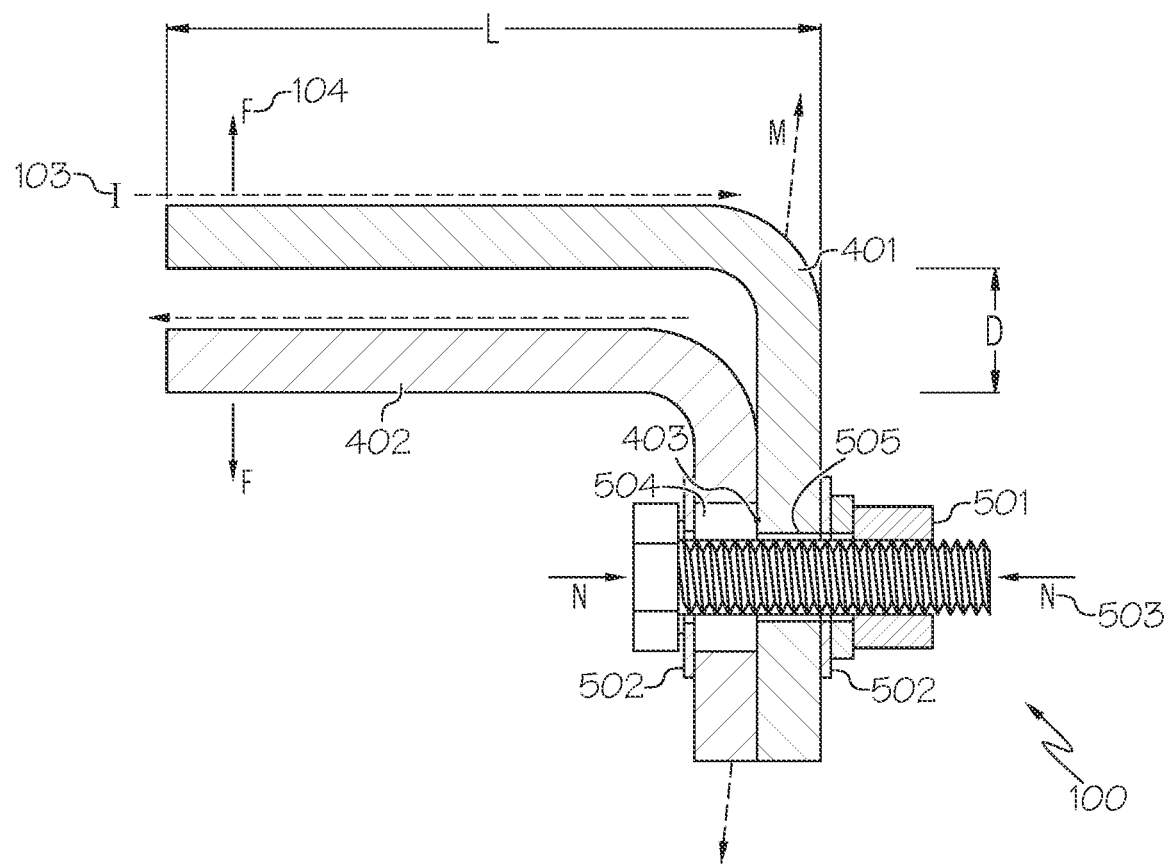
FIG. 5 illustrates the break point of a current loop in accordance with an embodiment of the present disclosure

FIG. 5 illustrates the break point of current loop 100 corresponding to FIG. 4 in accordance with an embodiment of the present disclosure. In one embodiment, current loop 100 is designed to break at the point shown in FIG. 5 when forces caused by the short-circuit current exceed a predetermined level for current loop 100. Similar to the loops previously shown in FIGS. 1 and 4, loop 100 is formed by a first conductor 401 and second conductor 402. The first and second conductors 401, 402 form current loop 100 with length (L) and distance (D) between the two conductors or the top and bottom portions of loop 100. The values for L and D may be selected as desired for the particular applications in accordance with the discussion provided herein. The current (I) 103 flows through loop 100 from the start of first conductor 401 towards the connection point 403 with second conductor 402, and from said connection point 403 towards the opposite end of second conductor 402 (broken arrows). Examples discussed herein involve copper conductors 401, 402, but other embodiments may contemplate other conductive materials.

The connected ends of first and second conductors 401, 402 are electrically connected and form a connection point secured together with a suitable fastener 501. In one embodiment, fastener 501 allows the first and second conductors 401, 402 to be secured together with a desired clamping force at connection point 403. Washers 502 may optionally be provided between the surfaces of fastener 501 and first and second conductors 401, 402. The desired clamping force (N) 503 is influenced by the performance desired from current loop 100. The nonlimiting example shown utilizes a suitable nut and bolt as the fastener 501. The fastener 501 or break point between first and second conductors 401, 402 needs to hold together at the current levels at and below the predetermined limits of a fuse, such as a downstream current-limiting fuse, so that the fuse can operate to interrupt current as it is intended for the MCC equipment or the like. It shall be apparent to one of ordinary skill that design factors of current loop 100, such as length, distance, clamping force (N), and conductor materials or friction coefficient (µ), are selected to allow current loop 100 to remain closed at the current levels of the fuse rating.

It should also be noted that one of the openings in one of conductors 401, 402 is significantly larger than the diameter of fastener 501, slotted or the like. The nonlimiting example shown illustrates a slotted opening 504 in second conductor 402, whereas, the other opening 505 in first conductor 401 is just large enough for fastener 501 to fit through. Fault currents beyond the peak let-through interrupting capability of the fuse are indicative of where the current loop operation is desirable for an internal arcing fault. In one embodiment, the mating surfaces of current loop 100 provide sufficient frictional force to withstand multiple down-stream load faults where the peak let-through current is reached and not open the loop. A force (F) is created by a symmetrical fault current (see Equation 2). When the force is greater than the frictional clamping force or the force ($F_s$) the design factors are selected to handle for the current loop 100 (e.g., 50 kA, 60 kA peak let-through), the loop opens due to movement (M) of first and second conductors 401, 402 in opposite directions (see broken arrows). In one embodiment, the oversized or slotted opening 504 allows the first and second conductors 401, 402 to move relative to each other when the force caused by the current loop exceeds a desired amount of separation force ($F_s$). This movement allows the current loop, such as current loop 100, to create a gap between the conductors, such as conductors 401, 402, where a new arc will ignite. In one embodiment, the movement does not shear fastener 501. In one embodiment, such a force is only on loop 100 until the fuse clears (e.g., maximum of 8.3 ms). The applied Force ($F_s$) to separate loop 100 can be determined from the following:

$$F_s = \mu \times N \qquad \text{(Equation 3)}$$

It shall be apparent to one of ordinary skill in the art that the length of current loop 100, the distance between conductors 401, 402 of current loop 100, the clamping force, and materials (µ, frictional coefficient) are factors relevant and carefully selected so that current loop 100 will separate or open at a desired fault current or greater. Thus, the separation force ($F_s$) at which current loop 100 creates a gap between the conductors, such as conductors 401, 402, where a new arc will ignite can be tuned in accordance with the above noted factors for different MCCs, equipment, or the like.

Examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Figure 6:
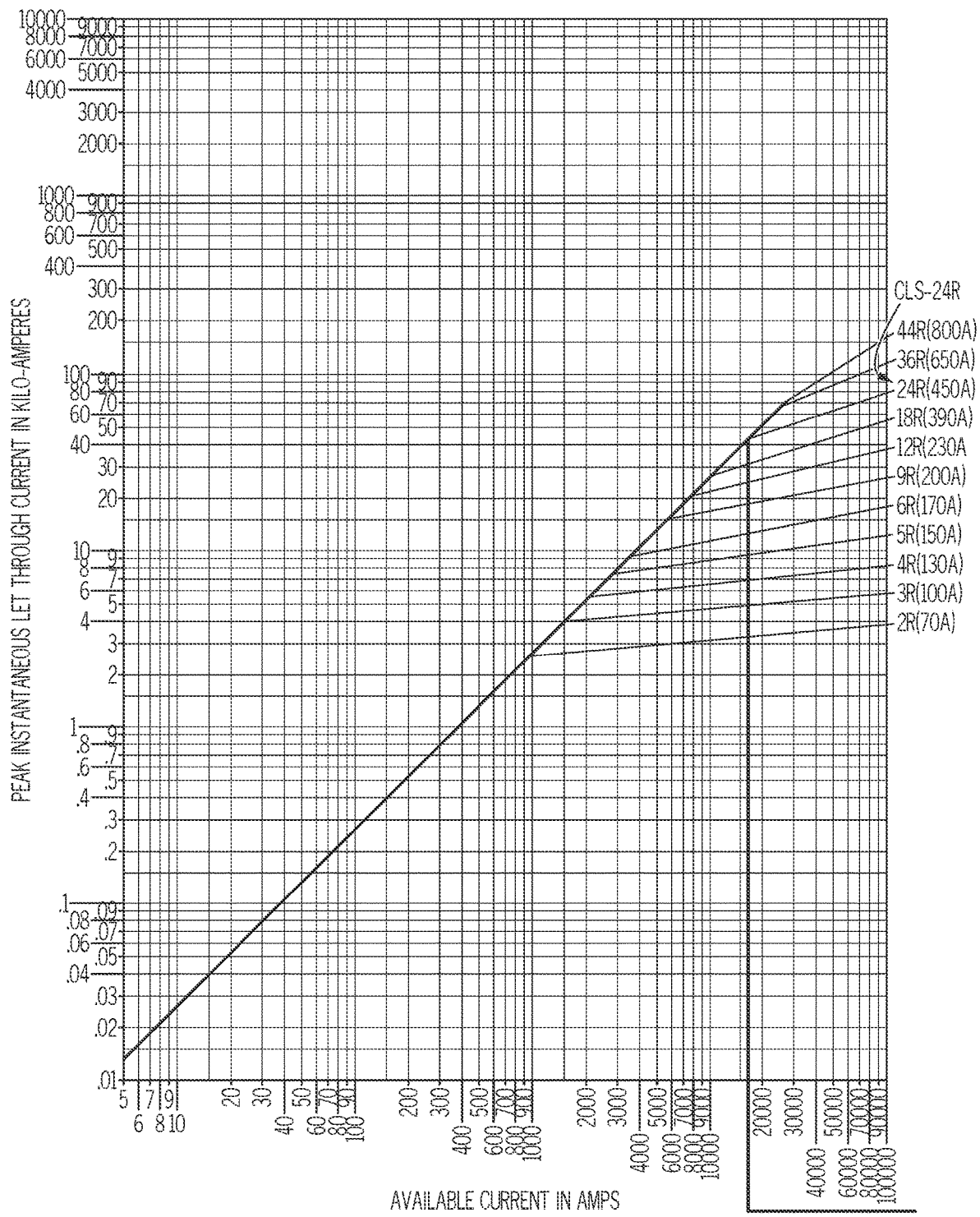
FIG. 6 illustrates a CLS-24R peak let-through curve in accordance with an embodiment of the present disclosure.

For purposes of illustration, nonlimiting examples are discussed herein. In particular, a nonlimiting example corresponding to FIGS. 4 and 5 is discussed herein. It is noted that prior dimensions and design factors previously discussed are not repeated for the sake of brevity. In one embodiment, the maximum short-circuit current desired for the equipment is 50 kA rms sym. The peak current for a 50 kA rms sym fault is 130 kA at the crest of the first current cycle. The equipment down-stream of the contactor assembly is protected by a current-limiting fuse. The highest rated fuse used is a 7CLS-24R which goes into current limiting mode at 42 kA and has a peak let-through current of 60 kA as illustrated in FIG. 6. FIG. 6 illustrates various peak let-through curves, such as CLS-24R, in accordance with an embodiment of the present disclosure. As shown in FIG. 6, the available 50 kA rms (root mean square) current corresponds to a 60 kA peak. A 42 kA peak corresponds to an available 16 kA rms current.

Using Equation 1 and the dimensions of the nonlimiting example of FIG. 4 for a symmetrical fault of 50 kA (60 kA peak let-through):

$$F = 0.12 \frac{(50)^2 (4.75)}{0.24}$$

$$F = 5{,}937.5 \text{ lbs. force}$$

For a symmetrical fault of 16 kA (42 kA peak let-through):

$$F = 608 \text{ lbs. force}$$

In one embodiment, a ⁵⁄₁₆-18 grade 5 bolt is utilized as a fastener, such as fastener 501 of FIG. 5, in the nonlimiting example to secure first and second conductors, such as conductors 401, 402, together. Referring to FIG. 5, fastener 501 provides a torque equal to 22 ft-lbs. and a clamping force (N) equal to 3,338 lbs. In one embodiment, the frictional coefficient for a copper-to-copper interface between the first and second conductors, such as conductors 401, 402, is µ=1.6.

From the calculations above, the frictional force at the current loop mating surface or connection point 403 is designed to hold 5,937.5 lbs. of force applied to the bar. When the fault current is below the available 42 kA rms current, the fuse remains in normal time-current melting mode and the maximum sustained forces applied to current loop 100 will be less than 608 lbs. for a symmetrical fault of 16 kA, which is below the force required to overcome the frictional clamping force or separation force ($F_s$).

When the fault current exceeds 42 kA, the fuse moves into a current-limiting mode and will only allow current flow for a maximum of a ½ cycle (0.0083 s on a 60 Hz system). The current loop design of the present disclosure allows the downstream fuse of the equipment, or the MVMCC in this case, to operate in a normal manner. In one embodiment, the force created by the maximum available symmetrical fault current of 50 kA (60 kA peak let-through) is 5,937.5 lbs., which is greater than the frictional clamping force (e.g., $F_s \geq 5{,}340$ lbs.). This force is only on the loop until the fuse clears (e.g., maximum of 8.3 ms).

Figure 7A:
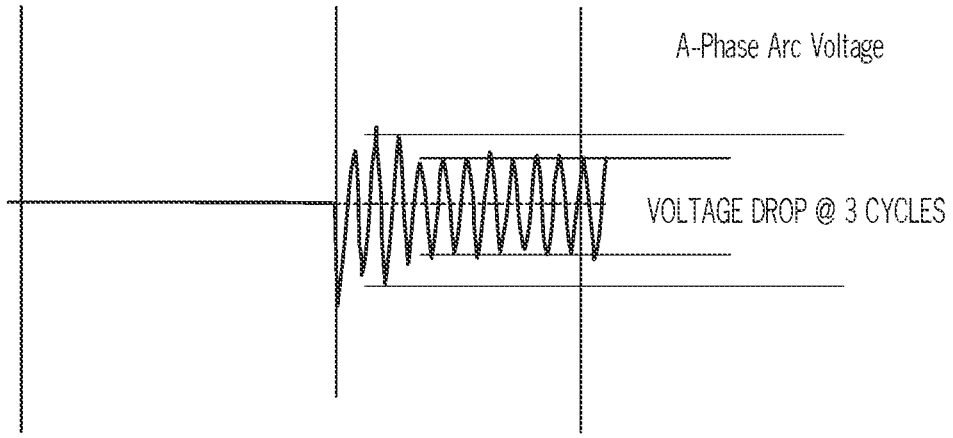
FIGS. 7A-7D illustrate arc voltage waveforms in accordance with an embodiment of the present disclosure.
Figure 7B:
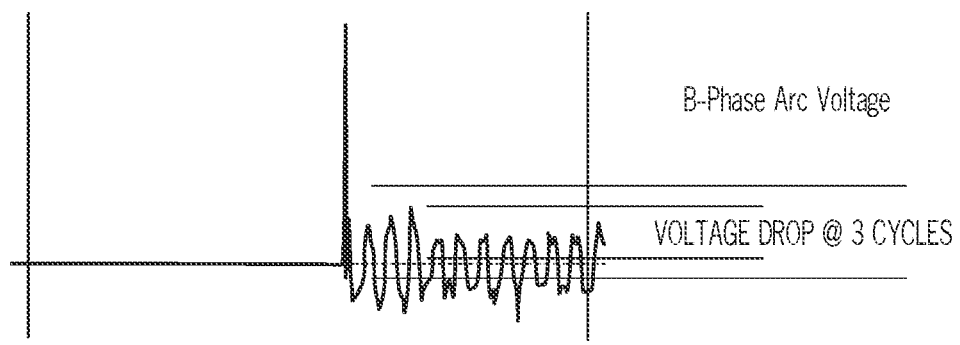
Figure 7C:
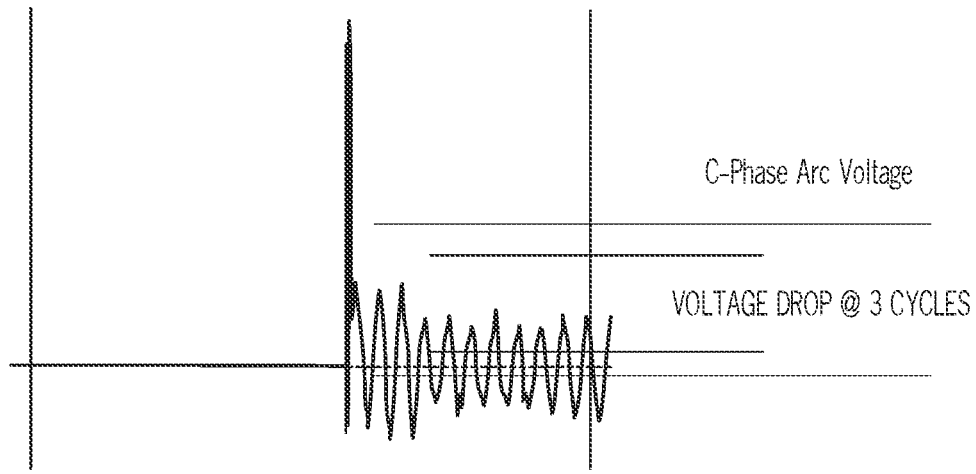
Figure 7D:
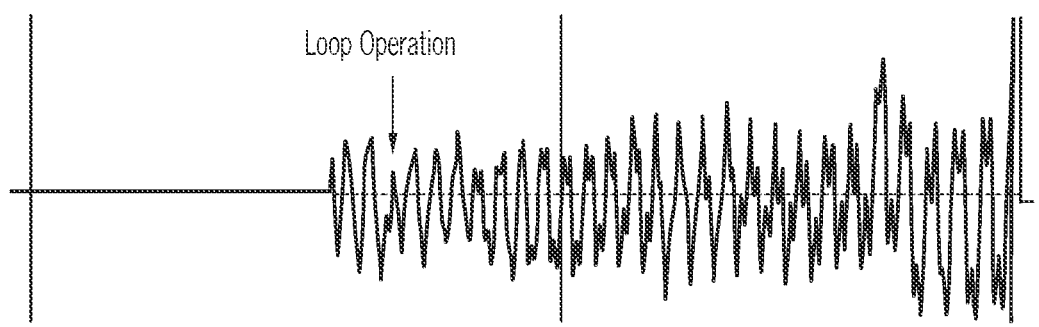

Referring now to FIGS. 7A-7D, FIGS. 7A-7D show traces from the arc fault testing in accordance with an embodiment of the present disclosure. In particular, FIG. 7A illustrates the arc voltage for the A-phase (one of the three phases of the MVMCC equipment). FIG. 7B illustrates the arc voltage for the B-phase (one of the three phases of the MVMCC equipment). FIG. 7C illustrates the arc voltage for the C-phase (one of the three phases of the MVMCC equipment). FIG. 7D illustrates the arc voltage for the ground current, where the loop operation of the present disclosure reduces the arc energy at the point of initiation and relocates the energy release point to an area closer to an exhaust vent for the equipment design.

As shown in FIGS. 7A-7C, there is some indication that the current loop requires around 3 current cycles (50 ms) to open as shown in the arc voltage waveforms of FIGS. 7A-7C. Therefore, the nonlimiting exemplary current loop should not separate under downstream fault conditions normally cleared by the fuse operation below 50 kA.

Systems and methods discussed herein provide arc-resistant equipment or a motor control center (MCC) utilizing a current loop. The current loop may be formed from two conductors, and the current loop may have a length (L) of parallel conductors of the loop and distance (D) between the two conductors. Current (I) flows through the current loop from the starting end of a first conductor towards the opposite end or the connection point electrically connected to a second conductor. The current flows from the connection point or starting end of the second conductor towards the opposite end of the second conductor.

In some embodiments, the starting end of the first conductor receives current from the equipment or MCC, such as a bus (e.g., bus 302) of the equipment or MCC, and the opposite end of the second conductor returns current to another portion of the equipment or MCC, such as another bus (e.g., bus 303) of the equipment or MCC. A fastener, such as a nut and bolt, allows the first and second conductors to be secured together with a desired clamping force at the connection point. Due to the current flow through the current loop, a force may be exerted on the conductors in opposing directions due to the left-hand rule for magnetic force. An oversized opening, either in the first or second conductor, allows the first and second conductor to move relative to each other when the force caused by the current loop exceeds a desired amount of separation force ($F_s$). The movement allows the current loop to create a gap between the two conductors where a new arc will ignite.

In some embodiments, the current loop is designed to create a gap when a fault or symmetrical fault exceeds a predetermined amount, such as 50 kA or greater. In some embodiments, the length (L) of the current loop is 4.75 inches. In some embodiments, the distance (D) between the conductors of the loop is 0.24 inches. In some embodiments, the friction coefficient ($\mu$) of the conductors is $\mu=1.6$. In some embodiments, the conductors are copper. In some embodiments, the clamping force is N=3,338 lbs. In some embodiments, the separation force is 5,937.5 lbs.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described, including various combinations of the different elements, components, steps, features, or the like of the embodiments described, and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative and should not be taken as limiting of the scope of the disclosure.

The invention claimed is:

1. An equipment with arc-resistant capability comprising:
   a bus configured to provide three-phase power from an incoming line; and
   a current loop formed from a first conductor and a second conductor, wherein a current is received from said bus, wherein said current loop uses electromagnetic forces of a short-circuit current caused by an internal arcing fault of said equipment to move said first and second conductors relative to each other, wherein said current loop creates a gap between said first and second conductors in response to said movement of said first and second conductors, wherein a new arc ignites at said gap.

2. The equipment as recited in claim 1, wherein said current flows through said current loop starting from a starting end of said first conductor towards an opposite end of said first conductor or a connection point electrically connected to said second conductor, wherein said current flows from said connection point or a starting end of said second conductor towards an opposite end of said second conductor.

3. The equipment as recited in claim 2 further comprises:
   a second bus receiving said current after flowing towards said opposite end of said second conductor.

4. The equipment as recited in claim 2 further comprises:
   a fastener securing said first and second conductors at said connection point.

5. The equipment as recited in claim 4, wherein said fastener comprises a nut and a bolt.

6. The equipment as recited in claim 4 further comprises:
   an oversized opening either in said first or said second conductor, wherein said oversized opening allows said first and second conductors to move relative to each other when a force caused by said current loop exceeds a separation force.

7. The equipment as recited in claim 6, wherein said separation force corresponds to approximately 5,900 pounds.

8. The equipment as recited in claim 1, wherein said gap is created when a fault or a symmetrical fault exceeds a predetermined amount of current.

9. The equipment as recited in claim 1, wherein a length of said current loop is 4.75 inches.

10. The equipment as recited in claim 1, wherein a thickness of said first and second conductors is 0.25 inches.

11. The equipment as recited in claim 1, wherein a friction coefficient of said first and second conductors is 1.6.

12. The equipment as recited in claim 1, wherein a metal of said first and second conductors comprises copper.

13. The equipment as recited in claim 1, wherein said equipment corresponds to a motor control center.

14. The equipment as recited in claim 1, wherein said equipment corresponds to a switchgear.

15. A method for improving control of an internal arc fault occurring within an equipment, the method comprising:
   forming a current loop from a first conductor and a second conductor, wherein said current loop uses electromagnetic forces of a short-circuit current caused by an internal arcing fault of said equipment to move said first and second conductors relative to each other; and creating a gap between said first and second conductors by said current loop in response to said movement of said first and second conductors, wherein a new arc ignites at said gap.

16. The method as recited in claim 15, wherein said gap is created when a fault or a symmetrical fault exceeds a predetermined amount of current.

17. The method as recited in claim 15, wherein a metal of said first and second conductors comprises copper.

18. The method as recited in claim 15, wherein a friction coefficient of said first and second conductors is 1.6.

19. The method as recited in claim 15, wherein said equipment corresponds to a motor control center.

20. The method as recited in claim 15, wherein said equipment corresponds to a switchgear.

\* \* \* \* \*